(12) United States Patent
Laner

(10) Patent No.: US 6,463,885 B1
(45) Date of Patent: Oct. 15, 2002

(54) HYGIENE SYSTEM

(76) Inventor: Cyriak Laner, Hartham 9 - Mittich, 94152 Neubaus (DE)

( * ) Notice: Subject to any disclaimer, the term of this patent is extended or adjusted under 35 U.S.C. 154(b) by 0 days.

(21) Appl. No.: 09/511,768

(22) Filed: Feb. 24, 2000

(30) Foreign Application Priority Data

Feb. 24, 1999 (DE) ...................... 299 03 099 U

(51) Int. Cl.⁷ ...................... A01K 13/00; A01K 29/00
(52) U.S. Cl. ...................... 119/652; 119/656; 119/673; 15/238
(58) Field of Search ...................... 119/650–652, 656, 119/673; 15/237–240

(56) References Cited

U.S. PATENT DOCUMENTS

| | | | | |
|---|---|---|---|---|
| 2,282,672 A | * | 5/1942 | Nelson | 15/215 |
| 3,663,980 A | * | 5/1972 | Conklin | 15/215 |
| 4,361,925 A | * | 12/1982 | Yamamoto et al. | 15/217 |
| 5,071,628 A | * | 12/1991 | Alazet | 422/292 |
| 5,173,346 A | * | 12/1992 | Middleton | 428/53 |
| 5,297,309 A | * | 3/1994 | Rotoli | 15/104.92 |
| 5,774,909 A | * | 7/1998 | Stable | 4/622 |
| 5,881,427 A | * | 3/1999 | Offner | 15/215 |

* cited by examiner

Primary Examiner—Charles T. Jordan
Assistant Examiner—Kimberly S. Smith
(74) Attorney, Agent, or Firm—Brezina & Ehrlich

(57) ABSTRACT

The invention relates to a hygiene system for cleaning the hoofs or claws or feet of animals or persons walking over it, having a liquid-saturated or liquid-absorbing mat, in particular a foam mat, characterized in that the mat is surrounded at least in part, at least on the underside and/or on the sides, by a liquid-proof flexible barrier layer and/or a liquid-permeable flexible permeated layer, and the mat is secured with a separable connection to the flexible barrier layer.

7 Claims, 1 Drawing Sheet

HYGIENE SYSTEM

BACKGROUND OF THE INVENTION

The invention relates to a hygiene system for cleaning the hoofs or claws or feet of animals or persons walking over it, having a liquid-saturated or liquid-absorbing mat, in particular a foam mat.

Until now, tubs or troughs or the like let into the ground were usually used; they were filled with a cleaning agent and/or disinfectant and were to be walked through for the sake of disinfection or cleaning.

There are also so-called hygiene mats on the market which contain a cleaning agent and/or disinfectant that while the animal or person walks over the mat bathes the hoofs or claws or shoes with the cleaning agent or disinfectant or puts them in contact with it.

Such mats comprise a liquid-proof coated tarpaulin, open at the top and forming a kind of tub, which is raised upward on its ends and stitched in such a way that a liquid-saturated or liquid-absorbing foam mat resting on the coated tarpaulin is hammered in or sheathed toward the underside and the sides. A mesh-weave cloth is provided on the side of the foam mat that is accessible from the top, so that the foam mat is completely enclosed by the tarpaulin and the mesh-weave cloth and is stitched into it.

The foam mat (absorbent layer) is saturated with liquid (disinfectant, treatment agent or therapeutic solution). When the person or animal walks on the mat, thus compressing the foam, the claw or foot is bathed by the liquid, which forms a small puddle.

On walking on the mat, the liquid is not immediately positively displaced to the side but instead is forced upward, thus rinsing the gaps between the claws or toes. In particular this makes it possible to treat these gaps.

One disadvantage of such hygiene mats is that if the mat is walked on in an unfavorable way, the ends can be pulled upward by the mesh cloth, and then a person or animal could stumble over the upward-protruding ends.

Another disadvantage of such hygiene mats is that if the foam wears out the mat must be replaced completely, and a particular disadvantage is that only surface cleaning of the mats is possible. It is not possible to completely change the therapeutic or treatment solution. Because of this, in the least favorable case, a mat can be used only a single time.

SUMMARY OF THE INVENTION

The object of the invention is to make a hygiene system available that is improved over the prior art, that overcomes the above disadvantages, and that in particular enables cleaning.

According to the invention, the mat of the hygiene system is surrounded at least in part, at least on the underside and/or on the sides, by a liquid-proof flexible barrier layer and/or a liquid-permeable flexible permeation layer, and the mat is secured with a separable connection to the flexible barrier layer.

As a result of the hygiene system according to the invention, it is assured that the mat will lie securely on the base below it, and the hygiene system is simple to clean because the mat is removable. This lengthens the service life of the hygiene system considerably. Versatile use of the hygiene system is now possible. If the mat, in particular a foam mat, becomes worn, it is no longer necessary to replace the entire hygiene system; only the mat has to be replaced, which represents a considerable potential cost saving.

Advantageously, the barrier layer on the sides of the mat is formed by stabilization chambers filled with a flexible material. As a result, the mat in the filled state continues to lie stably when it is walked on; it does not slip, and the lateral edges are not pulled upward when it is walked on. The stabilization chambers are advantageously filled with a foam and/or with water.

Accordingly, the stabilization chambers have a filling and evacuating device. As a result, the stabilization chambers can be filled either permanently or reversibly.

Preferably, toward two opposed ends, the mat can be connected to the barrier layer under it by a separable connection, in particular a hook-and-loop closure. As a result, the mat is designed to be separable from the barrier layer and can easily be cleaned or replaced.

Another advantageous feature provides that at least one and in particular four grips or handles are provided in the barrier layer. As a result, the hygiene mat is simple to transport and manipulate.

Advantageously, the hygiene mat comprises a tarpaulin tub, formed of the barrier layer on or in which the foam mat is located, and at least toward the top the mat is coated with a mesh-weave cloth, and the mat is joined to the barrier layer with the aid of a hook-and-loop closure.

Further advantages, special features and expedient refinements of the invention will be become apparent from the dependent claims.

BRIEF DESCRIPTION OF THE DRAWINGS

A preferred exemplary embodiment of the invention is described below in conjunction with the drawing.

DESCRIPTION OF THE PREFERRED EMBODIMENT

Figure 1:
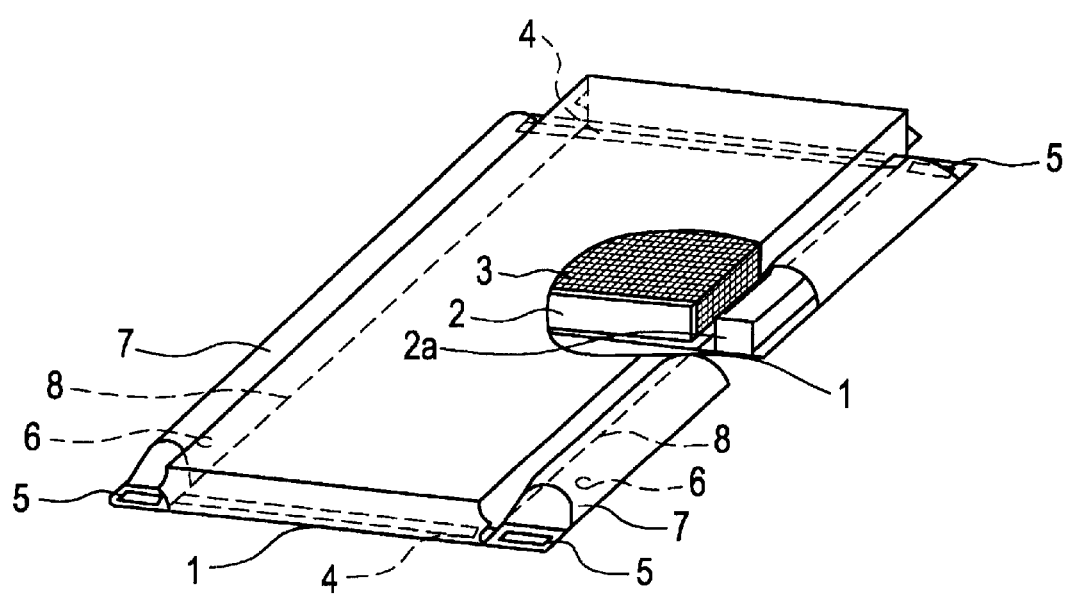
FIG. 1 shows a view of a hygiene mat according to the invention.

The exemplary embodiment, shown in FIG. 1, of a hygiene system according to the invention includes a tarpaulin tub 1, which forms the bottom for the treatment mat 2 and the stabilization chambers 7 and also forms the casing of the mat 2 and the chambers 7. The material used for this is a coated or similarly water-impermeable cloth. The mat 2 acts as an absorbent layer 2 and occupies about 70–80% of the total area of the hygiene system 1. The mat 2 has a thickness of about 2–10 cm and is made of foam, which is inserted between the tarpaulin Cub 1 and an upper layer 3 made of a mesh-weave cloth. The upper layer 3 (the mesh-weave cloth) protects the foam 2 against major soiling and excessive mechanical wear, makes it sip-proof, and lets liquid escape upward when walked on, to achieve the treatment function. On both broad sides, the mesh-weave cloth 3 has a hook-and-loop closure 4, which has a counterpart on the underside of the tarpaulin tub 1, making it easy to remove, clean or replace the foam 2. To achieve stability and so as not to deform or raise the long sides or corners when the mat is stepped on, and to make the mat rest stably at the intended place, the aforementioned stabilization chambers 7 are bound into the treatment mat on both sides, on the long sides. These chambers comprise a foam core 2a and the sheath forming tarpaulin tub 1, which is welded tightly lengthwise by watertight weld seam 8. For filling with water, an approximately 30 mm-wide opening 6 is welded onto the underside of each stabilization chamber 7 and can be closed with a screw-type plug. A total of four handles 5 are machined into the ends of the stabilization chambers 7, to make the hygiene system easier to handle.

What is claimed is:

1. A hygiene system for cleaning the hoofs or claws or feet of animals or persons walking thereover, comprising a liquid-saturated or liquid-absorbing mat having a top surface on which walking contact takes place, a bottom surface and side surfaces, in combination with a flexible, stabilizing tub and means for separably connecting the tub to the mat, the mat being surrounded at least on a portion of the side surfaces and optionally on at least a portion of the bottom surface, by the stabilizing tub which is formed from a liquid-proof flexible barrier layer, a liquid-permeable flexible permeation layer, or both, the tub on the side surfaces of the mat being formed by stabilization chambers filled with a flexible material.

2. The hygiene system of claim 1, wherein the flexible permeation layer is formed by a mesh-weave cloth.

3. The hygiene system of claim 1, wherein the mat is separably connected on two opposed side surfaces to the tub.

4. The hygiene system of claim 1, wherein the separable connecting means comprises a hook and loop closure.

5. The hygiene system of claims 1, wherein the stabilization chambers comprises filling and evacuating means.

6. The hygiene system of claim 1, wherein the tub comprises at least one handle.

7. The hygiene system of claim 1, wherein the mat is a foam mat.

* * * * *